Dec. 17, 1935.    J. E. WARRELL    2,024,405
APPARATUS FOR APPLYING ADHESIVES
Filed May 11, 1935    2 Sheets-Sheet 1
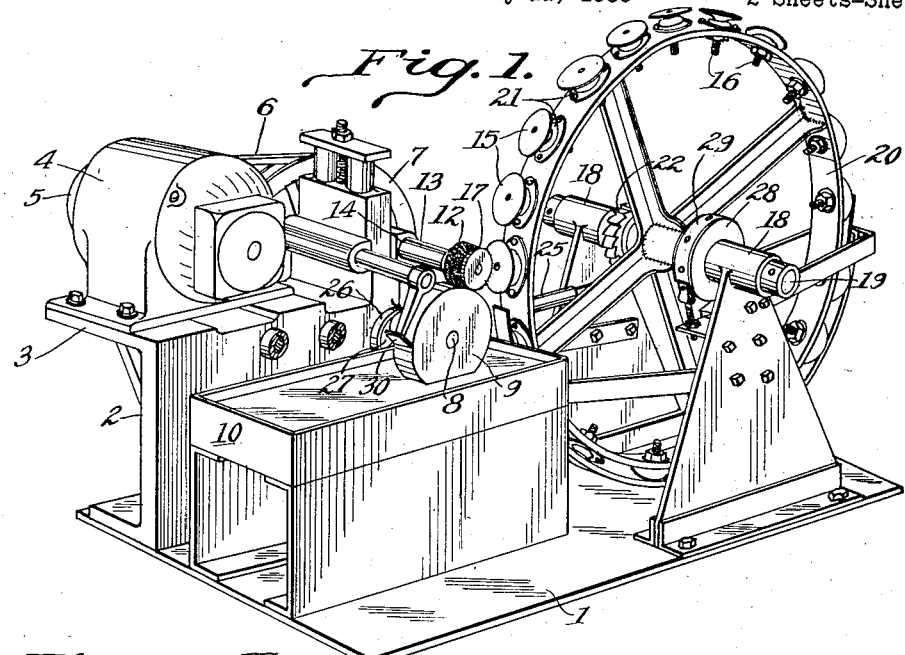
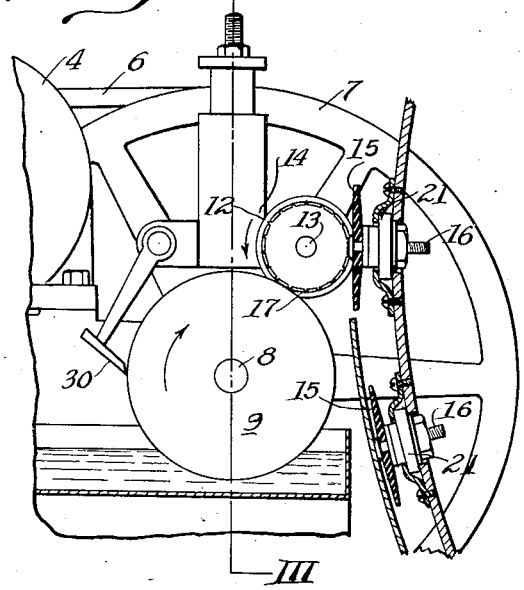
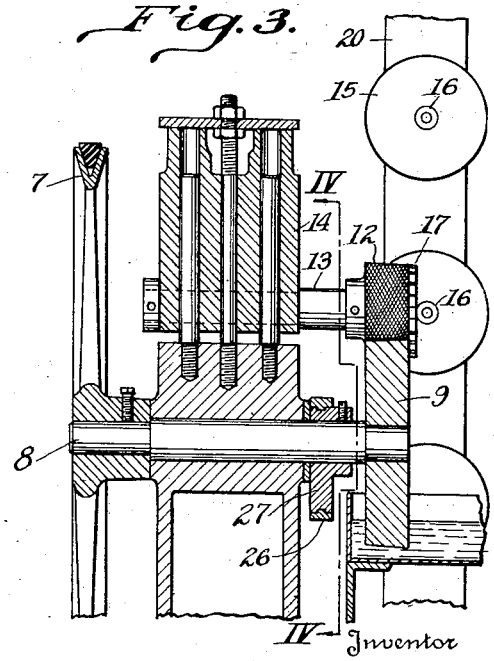
Inventor
Jonas E. Warrell
By
W. S. McDowell
Attorney Dec. 17, 1935.  J. E. WARRELL  2,024,405
APPARATUS FOR APPLYING ADHESIVES
Filed May 11, 1935  2 Sheets-Sheet 2
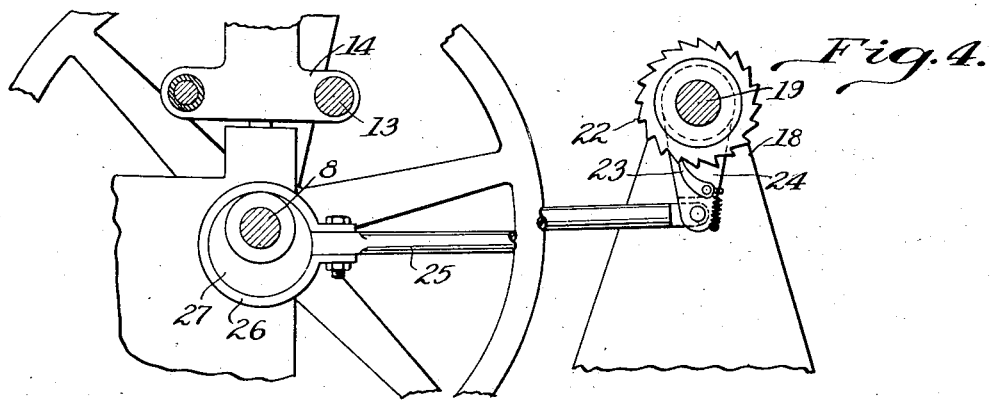
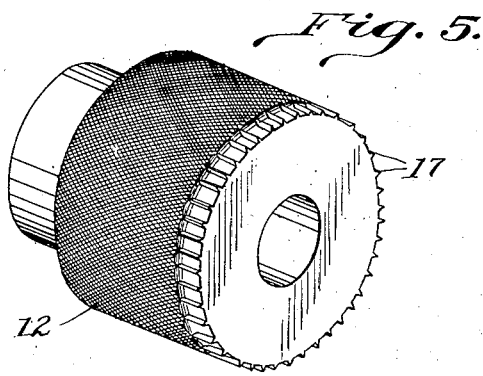
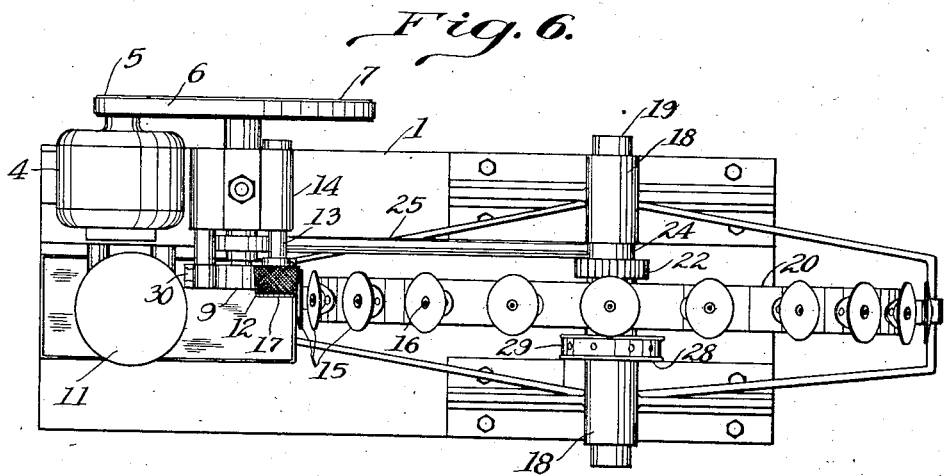
Inventor
Jonas E. Warrell
By W. S. M. Howell
Attorney Patented Dec. 17, 1935

2,024,405

UNITED STATES PATENT OFFICE 2,024,405

APPARATUS FOR APPLYING ADHESIVES

Jonas E. Warrell, Newark, Ohio, assignor to The Pharis Tire and Rubber Company, Newark, Ohio, a corporation of Ohio Application May 11, 1935, Serial No. 21,044

11 Claims. (Cl. 91—50)

The present invention has for its object to provide an improved method and machine for spreading in a relatively uniform manner on suitable surfaces adhesive materials, such as rubber, cements, glues, pastes, varnish, paints or the like. More specifically it is a further object of the invention to facilitate the operation of applying cements to rubber or rubber containing articles.

In the manufacture of rubber inner tubes for pneumatic motor vehicle tires, it is customary to form the tubes with openings for the reception of metallic valves which are used to control the inflation or deflation of the tubes. In securing these valves to the tube bodies, the stems of said valves are connected at their lower ends with rubber disks which, in turn, are cemented to the tube bodies over the openings formed in said bodies during manufacture for valve association purposes.

Hitherto, the operation of applying a rubber cement to the valve carrying disks has been done largely by hand operations which are relatively slow to execute and frequently imperfections result in the manufactured tubes by reason of failure to apply the proper amount of cement in a uniform manner to the rubber valve disks so as to effect their perfect union with the inner tubes. Accordingly, it is one of the outstanding objects of the present invention to provide a substantially automatic machine by which a rubber cement will be uniformly applied to the under surface of a valve carrying disk whereby to facilitate and to render less costly the operation of cementing such disks to the associated bodies of tire inner tubes.

In accordance with the present invention, my improved machine comprises a rotatable carrier having its outer peripheral portion formed with a plurality of circumferentially spaced sockets in which are loosely and rotatably received inner tube valves carrying associated rubber attaching disks, whereby through the rotation of the carrier, the disks will be successively presented to a rotatable cement applying wheel which, by frictional contact with said disks, applies to the inner surface of each of the latter a uniform coating of a rubber cement so that when the valves and their associated disks are removed from the carrier, the same will be provided with the proper amount of cement to insure their effective union with inner tube bodies, the operation of the machine being substantially automatic with the exception of the manual placing of the valves and their associated disks in the spaced sockets of the carrier and the removal of said valves and disks from the carrier following the application of cement thereto.

For a further understanding of the invention, reference is to be had to the following description and the accompanying drawings, wherein:

Fig. 1 is a perspective view of a cement applying machine constructed in accordance with the present invention, the cement storage tank being omitted;

Fig. 2 is an enlarged vertical sectional view disclosing more particularly the cement applying rolls;

Fig. 3 is a vertical transverse sectional view taken through the drive mechanism for said rolls, on the line III—III of Fig. 2;

Fig. 4 is a vertical sectional view disclosing the pawl and ratchet mechanism for rotating the carrier wheel, on the line IV—IV of Fig. 3;

Fig. 5 is a detail perspective view of the cement applying roll;

Fig. 6 is a top plan view of the machine.

Referring more particularly to the drawings, the numeral 1 designates the base of the machine with which is connected an upstanding frame 2, the latter being provided with a horizontal shelf 3 upon which is mounted an electric motor 4, the latter being preferably of the brushless type in order to avoid the possibility of fire when inflammable solvents are used. The armature shaft of the motor 4 is equipped with a small pulley 5 around which passes an endless belt 6 which leads to an enlarged pulley wheel 7 carried by one end of a shaft 8 which is suitably journaled for rotation in bearings carried by the frame 2.

The other end of the shaft 8 is equipped with a cement feeding roll 9 which is adapted to rotate in the direction of the arrow disclosed in Fig. 2. The lower portion of the roll 9 is normally immersed in a fluid or semi-fluid body such as a rubber cement, the latter being kept in a trough or pan 10 suitably supported in connection with the frame 2.

A storage tank 11 supported in connection with the frame 2 is employed to hold the major portion of the cement which is delivered in regulated quantities to the pan 10. Also, the cement or other material contained within the pan 10 may be heated, for instance, by concealed electric resistor coils in order to cause the fluid to possess a desired consistency.

The upper portion of the feeding roll 9 frictionally contacts with an applicator roll 12, the latter being carried by the outer end of an arbor 13 adjustably mounted in bearings 14 formed with the frame 2. The applicator roll 12 is preferably of a slightly tapered form in order to conform to the shape of the rubber disk-like base 15 of a metallic tire valve 16. The roll 12 is also formed near its outer edge with a roll of small toothed projections 17 which cause the valve stem and its associated base 15 to rotate when in contact with the applicator roll.

To present the roll 12 to the relatively flat inner surfaces of the valve bases 15, the frame 2 and one end of the base includes bearings 18 which support the shaft 19 of a carrier wheel 20. The rim of this wheel is provided with a plurality of circumferentially spaced socketed holders 21 which are adapted to loosely and rotatably received the valve stem 16 so that the bases 15 will be arranged beyond the rim in substantially parallel relationship therewith. The wheel 20 is rotated intermittently to successively present the bases 15 to the roll 12 by providing the shaft 19 of said wheel with a ratchet 22 arranged for engagement with a spring pressed pawl 23. The latter is carried by an oscillating arm 24 loosely carried at its upper end by the shaft 19, the lower end of the arm 24 is connected to one end of a rod 25, the opposite end of the latter terminating in a strap 26 which surrounds an excentric 27 rotatable with and carried by the shaft 8. As the shaft 8 rotates at a predetermined and relatively slow rate of speed, the eccentric thereon reciprocates the rod 25, oscillating the arm 24 and through the operation of the pawl and ratchet mechanism imparts step by step rotary movement to the wheel 20.

Preferably, the timing of this mechanism is such that each of the valve bases 15 will be rotated through two distinct turns while engaged with the applicator roll 12, assuring a proper and even distribution of an adhesive to each of said bases. To retain the carrier wheel in its adjusted positions when not being rotated by the pawl and ratchet mechanism, the hub of said wheel may be provided with a drum 28 with which engages an adjustable friction band 29, the latter terminating in threaded extensions which may be adjusted to regulate the friction thus imparted to the wheel.

In the use of the machine, the operator is merely required to place uncemented valve stems and their associated bases in the sockets of the wheel 20 and to remove from such sockets valves in which the bases thereof have been coated with the cement. Otherwise, the operation of the machine is fully automatic. The feeding roll may have associated therewith a stationary blade 30 for regulating the amount of adhesive which adheres to the peripheral portion of the feeding roll during the rotation of the latter in the cementing fluid.

By virtue of the construction described, the operation of applying cement to rubber valve disks of the type set forth is greatly facilitated and rendered economical. Each valve disk receives its required degree of cement to assure its proper subsequent association with a tire inner tube and waste or loss of the cement is precluded. The machine comprising the present invention is of course subject to considerable modification from the form herein specifically described and illustrated without departure from the essential features of the invention, as the latter have been set forth in the following claims.

What is claimed is:

1. In a cement applying machine, a frame, a wheel rotatably supported by said frame and having the rim thereof provided with a plurality of circumferentially spaced sockets, said sockets being formed for the removable and rotatable reception of valve stems having rubber disk-like bases attached thereto, means for imparting intermittent rotary movement to said wheel, and a cement applying roll carried by said frame and disposed to rotatably engage the valve stem bases arranged on the rim of said wheel.

2. In a cement applying machine, a rotatable work support, holders formed in connection with said support for the removable and rotatable reception of valve stems carrying disk-like rubber bases, a cement applying roll, and means for intermittently moving said support to present said bases successively to the face of said roll.

3. In a cementing machine, a movable work support, said support being provided with spaced sockets for the removable and rotatable reception of valve stems carrying rubber disk-like bases, a cement applying roll mounted independently of said support, means for applying cement to the surface of said roll, and means for imparting intermittent movement to said support to successively bring the bases of said valves into rotatable contact with the outer surface of said roll.

4. In a cement applying machine, a frame structure including a cement containing trough, a power driven wheel disposed for engagement with the cement in said trough, an applicator roll in frictional contact with the upper peripheral portion of said wheel, a movable work support carried by said frame, said support being provided with a plurality of spaced sockets for the removable and rotatable reception of valve stems having rubber disk-like bases connected therewith, and means for imparting intermittent movement to said support to successively bring the rubber bases of said valves into frictional rotating engagement with the peripheral portion of the cement applying roll.

5. In a cementing machine, a rotatable work carrier provided with a rim, said rim having a plurality of circumferentially spaced sockets formed therein for the removable and rotatable reception of the axial stems of disk-like rubber bases, a cement container, a wheel rotatably engageable with the cement provided within said container, an applicator roll mounted independently of said carrier and arranged in frictional engagement with the upper peripheral portion of said wheel, a motor driven shaft for rotating said wheel, and means actuated by said shaft for imparting intermittent rotation to said carrier, whereby to successively present said rubber bases to said applicator roll.

6. In a machine for applying cement to the rubber bases of inner tube valves comprising: a base, a frame structure carried by said base, a container for a fluid cement supported by said frame structure, an electric motor, a shaft journaled in said frame structure and driven by said motor, a wheel carried by one end of said shaft and rotatable in the cement container, a cement applying roll supported by said frame structure in contact with the upper portion of said wheel, a rotatable work carrier supported by said frame structure, said carrier being formed with a rim having circumferentially spaced sockets provided therein for the rotatable and removable reception of valve stems carrying rubber disk-like bases, and means driven by said shaft for imparting rotary movement to said carrier to successively bring said rubber bases into frictional and rotatable contact with the outer face of said roll.

7. In a machine for applying cement to the rubber bases of inner tube valves comprising: a base, a frame structure carried by said base, a container for a fluid cement supported by said frame structure, an electric motor, a shaft journaled in said frame structure and driven by said motor, a wheel carried by one end of said shaft and rotatable in the cement container, a cement applying roll supported by said frame structure in contact with the upper portion of said wheel, a rotatable work carrier supported by said frame structure, said carrier being formed with a rim having circumferentially spaced sockets provided therein for the rotatable and removable reception of valve stems carrying rubber disk-like bases, and pawl and ratchet mechanism driven by said shaft for imparting intermittent rotation to said carrier to successively bring said rubber bases into frictional and rotatable contact with the outer face of said roll.

8. In a machine for applying cement to the rubber bases of inner tube valves comprising: a base, a frame structure carried by said base, a container for a fluid cement supported by said frame structure, an electric motor, a shaft journaled in said frame structure and driven by said motor, a wheel carried by one end of said shaft and rotatable in the cement container, a cement applying roll supported by said frame structure in contact with the upper portion of said wheel, a rotatable work carrier supported by said frame structure, said carrier being formed with a rim having circumferentially spaced sockets provided therein for the rotatable and removable reception of valve stems carrying rubber disk-like bases, pawl and ratchet mechanism driven by said shaft for imparting intermittent rotation to said carrier to successively bring said rubber bases into frictional and rotatable contact with the outer face of said roll, and friction means for positively holding the carrier against rotation when the carrier is not being rotated by the pawl and ratchet mechanism.

9. In a cement applying machine, a work support provided with a socket for the removable and rotatable reception of a valve stem having a rubber disk-like base attached thereto, a cement container, a gatherer for removing cement from said container, a cement applying roll in frictional contact with said gatherer and with the base of said valve stem, and means for imparting rotation to said roll to cause the rotation of said valve stem and base in unison therewith.

10. In a cement applying machine, a work support provided with a socket for the removable and rotatable reception of a valve stem having a rubber disk-like base attached thereto, a cement container, a gatherer for removing cement from said container, a cement applying roll in frictional contact with said gatherer and with the base of said valve stem, and means for imparting rotation to said roll to cause the rotation of said valve stem and base in unison therewith, said roll being provided with a row of projections disposed for engagement with said base to effect the positive rotation of the latter in unison with said roll.

11. In a cement applying machine, a metallic applicator roll having a tapered outer face, and a row of pointed projections extending from said face.

JONAS E. WARRELL.